United States Patent [19]

Long

[11] Patent Number: 5,803,727
[45] Date of Patent: Sep. 8, 1998

[54] BURNER ASSEMBLY FOR BURNING APPLIANCES

[75] Inventor: Norris R. Long, Wichita, Kans.

[73] Assignee: The Coleman Company, Inc., Wichita, Kans.

[21] Appl. No.: 792,577

[22] Filed: Jan. 30, 1997

[51] Int. Cl.$^6$ .............................. F24C 5/02; F24C 5/20; F23D 11/44

[52] U.S. Cl. ..................... 431/247; 431/207; 126/39 R; 126/38; 126/44

[58] Field of Search ..................................... 431/344, 103, 431/104, 105, 106, 107, 207, 203; 126/38, 40, 44, 39 R

[56] References Cited

U.S. PATENT DOCUMENTS 3,877,458  4/1975  Allander ................................. 431/247

OTHER PUBLICATIONS

Coleman Company, Inc., Aug. 1995 catalog, six page advertisement for "1996 Peak 1 Butane Stoves and Lanters".

Primary Examiner—Carl D. Price
Attorney, Agent, or Firm—Fitzpatrick, Cella, Harper & Scinto

[57] ABSTRACT

A burner assembly includes an outer housing having a generally cylindrical internal bore and a generally cylindrical inner housing within the bore of the outer housing. The inner housing is thermally insulated from the outer housing by a pair of axially spaced flanges on the inner housing and by a generally conical bottom wall on the outer housing. The inner housing has a fuel inlet opening and a fuel outlet which communicates with a burner. A generator tube has a fuel inlet end, an intermediate portion which is positioned adjacent the burner, and a fuel outlet end which extends through the outer housing to the fuel inlet opening of the inner housing.

29 Claims, 3 Drawing Sheets

BURNER ASSEMBLY FOR BURNING APPLIANCES

BACKGROUND

This invention relates to a burner assembly for a burning appliance such as a campstove, lantern, heater, etc.

Burning appliances may be fueled by liquid fuel or by liquefied petroleum gas (LPG) such as butane, propane, and mixtures of butane and propane. Liquid fuel is liquid at atmospheric pressure at sea level and may be Coleman® fuel, unleaded gasoline, etc. LPG is normally a gas at atmospheric pressure at sea level. LPG is supplied in pressurized fuel containers which contain a liquid phase and a vapor phase.

Burning appliances which are fueled by liquid fuel or by the liquid phase of LPG conventionally include a generator for vaporizing the fuel before the fuel reaches the burner. The generator commonly includes a tube or conduit which extends near the burner so that heat from the burner heats and vaporizes liquid fuel within the generator tube.

The vaporized or gaseous fuel generally flows from the generator to a burner assembly which includes a porous metal filter and a gas tip having a small orifice or jet. Commercial grades of butane fuel may be contaminated with small amounts of heavy petroleum products or other impurities which condense after leaving the generator and accumulate in the filter. The condensed components can eventually plug the filter, thereby reducing heat output, and can also flow through the orifice of the gas tip and overflow the gas tip.

Condensation is a particular problem with burners which are fueled by the liquid phase of LPG because the liquid fuel cools the portion of the burner assembly through which it flows.

SUMMARY OF THE INVENTION

The invention provides a burner assembly which thermally isolates the vaporized fuel which flows from the generator and reduces or eliminates condensation of fuel components. The burner assembly reduces plugging and operates substantially longer than conventional burner assemblies before heat output is reduced.

The burner assembly includes an outer housing having fuel inlet and outlet openings, an internal bore, and a generator tube opening. An inner housing is positioned in the bore of the outer housing and is thermally insulated from the outer housing. The inner housing has a internal bore and a fuel inlet opening. A gas tip closes the bore of the inner housing, and a mesh screen is positioned in the inner housing below the gas tip. A burner tube extends from the gas tip to a burner. A generator tube extends from the fuel outlet opening of the outer housing, past the burner, through the generator tube opening in the outer housing, and to the fuel inlet opening of the inner housing.

Since the inner housing is thermally insulated from the outer housing, the temperature of the inner housing is almost as hot as the vaporized fuel which flows out of the generator tube. Condensation is thereby minimized. The mesh size of the screen is larger than the pores of conventional porous metal filters. Since the mesh size is larger and since there is less condensation, the amount of time required for the screen to plug is greatly increased.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
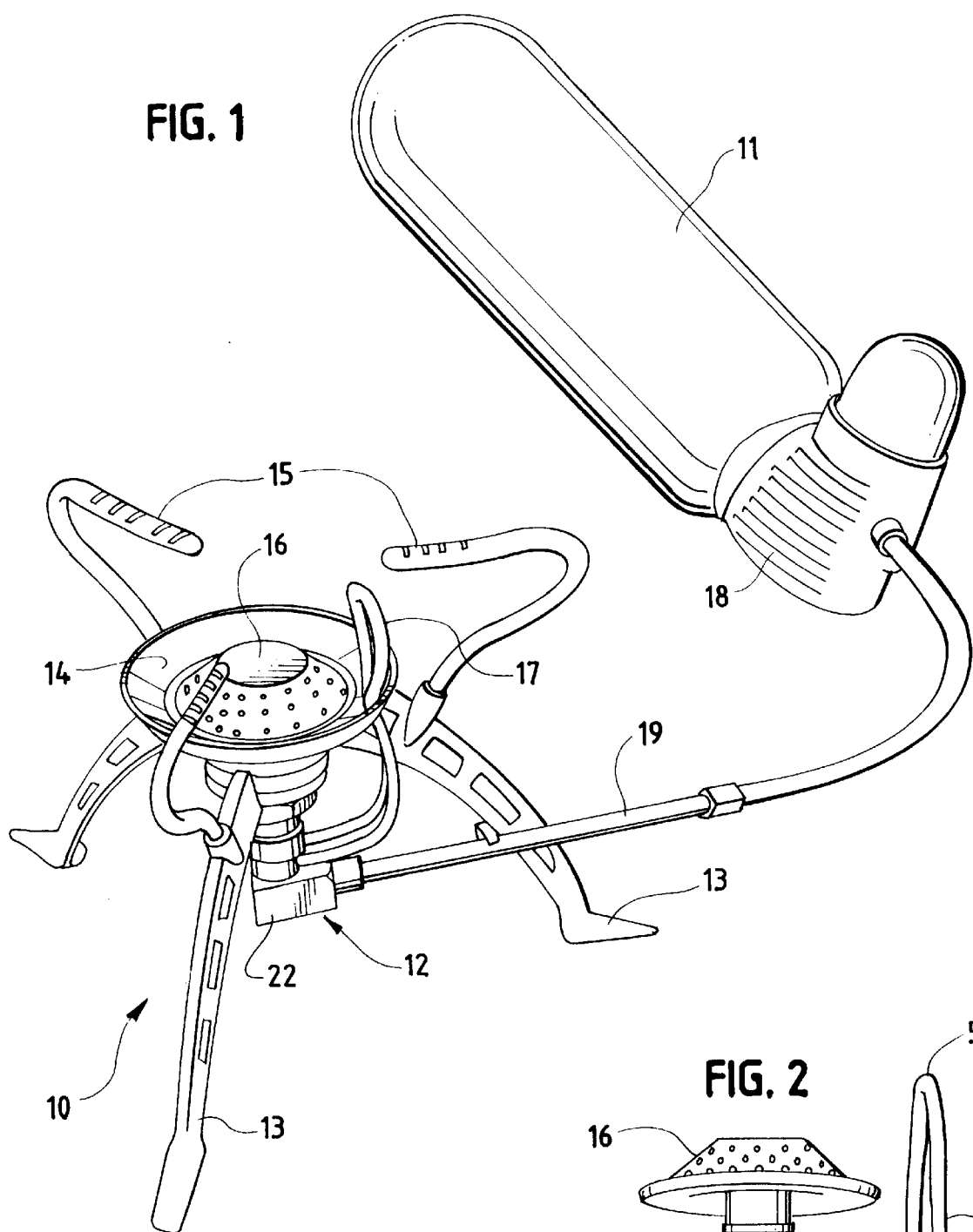
FIG. 1 is a perspective view of a backpacker's stove which includes a burner assembly in accordance with the invention.

The invention will be explained with reference to a backpacker's stove 10 illustrated in FIG. 1. It will be understood, however, that the invention can be utilized with other burner appliances, such as campstoves, lanterns, heaters, etc.

The stove 10 is fueled by an LPG fuel tank 11 which contains butane or a mixture of butane and propane. However, the invention can also be used with other fuels, including liquid fuels such as Coleman® fuel and unleaded gasoline.

The stove includes a burner assembly 12 which is supported by legs 13, a burner bowl 14, and pot supports 15. The burner assembly includes a perforated burner head 16 inside of the burner bowl and a generator tube 17 which extends through an opening in the burner bowl.

Fuel flows from the fuel tank 11 through a control valve 18 and a fuel conduit 19 to the burner assembly. The particular fuel tank illustrated includes a dip tube which extends into the liquid phase of the LPG fuel so that liquid fuel flows to the burner assembly.

Figure 3:
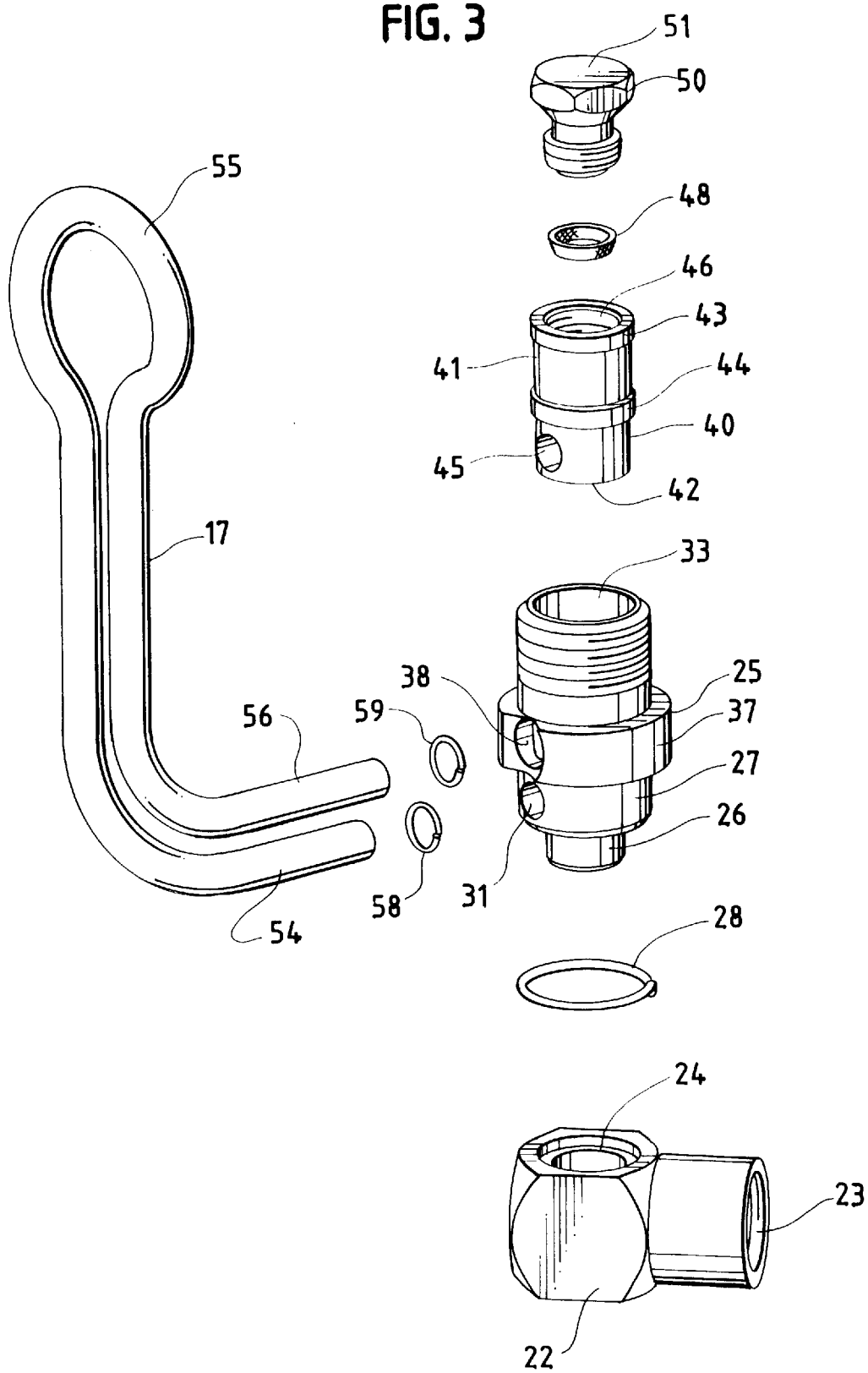
FIG. 3 is an exploded view of a portion of the burner assembly.
Figure 4:
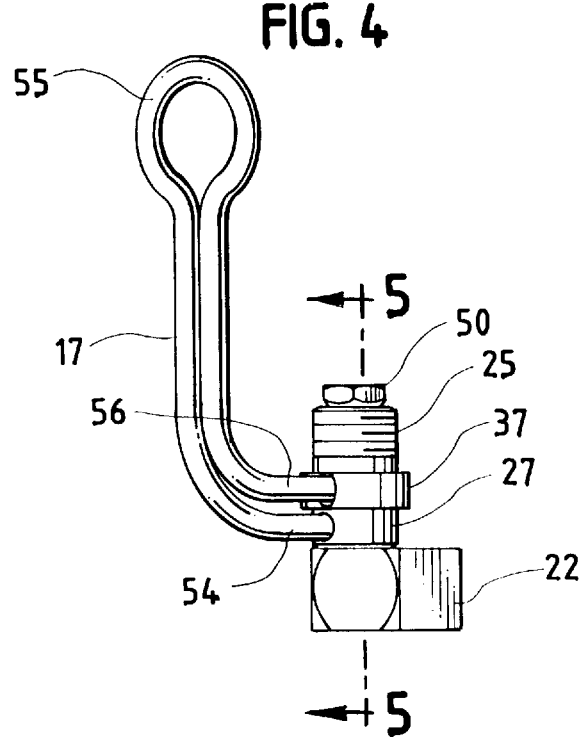
FIG. 4 illustrates the components of FIG. 3 assembled.

Referring to FIG. 3, the burner assembly includes an elbow-shaped burner base 22 which includes an inlet end 23 which is connected to the fuel conduit 19 and upwardly facing outlet opening 24.

Figure 5:
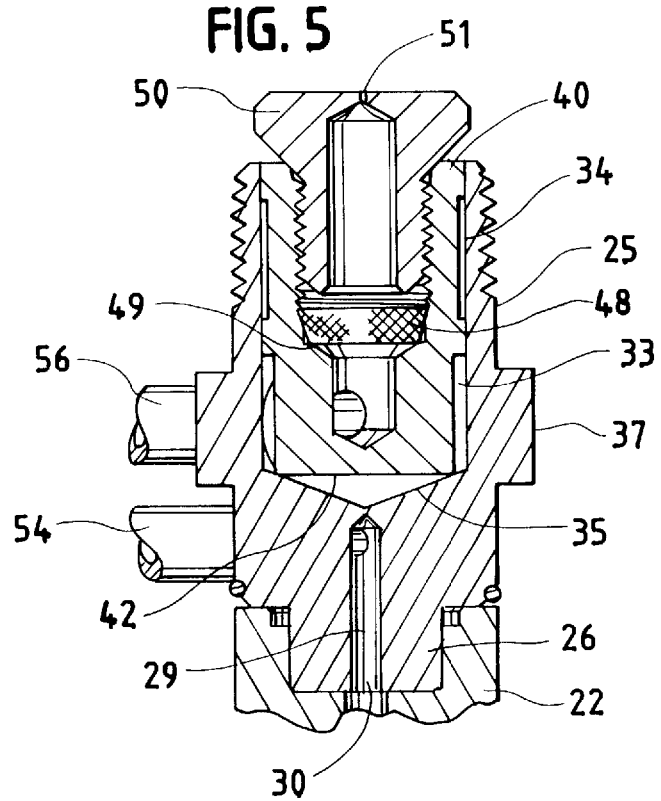
FIG. 5 is an enlarged fragmentary sectional view taken along the line 5—5 of FIG. 4.

An outer housing or tower 25 includes a small diameter bottom end portion 26 which fits into the top opening 24 of the base 22 and a radially enlarged collar 27 which is supported by the base. The outer housing is brazed to the base by a brazing ring 28. A fuel passage 29 (FIG. 5) extends from a fuel inlet opening 30 in the bottom end 26 to a fuel outlet opening 31 (FIG. 3) in the side of the collar 27.

The upper portion of the outer housing 25 is generally tubular and has an internal cylindrical bore 33 which is provided by an internal cylindrical surface 34 and a bottom wall 35 which separates the bore 33 from the fuel passage 29. The top surface of the bottom wall is conical. The central portion of the outer housing includes a radially enlarged flange 37. An opening 38 for the generator tube extends through the flange into the bore 33.

A tubular inner housing or spool 40 is positioned within the bore 33 of the outer housing. The inner housing includes a generally cylindrical side wall 41 and a flat bottom wall 42 which is supported by the conical bottom wall 35 of the bore 33. The outer surface of the side wall 41 is spaced from the inside surface 34 of the outer housing by a pair of axially spaced flanges or lands 43 and 44 which extend radially outwardly from the side wall 41. A fuel inlet opening 45 extends through the side wall 41 to an internal bore 46. The fuel inlet opening 45 is aligned with the opening 38 in the outer housing through which the generator tube extends.

A cup-shaped mesh metal screen 48 is supported by shoulder 49 (FIG. 5) in the bore 46. A gas tip 50 is screwed into the bore 46. The gas tip is provided with a small orifice or gas jet 51.

Figure 2:
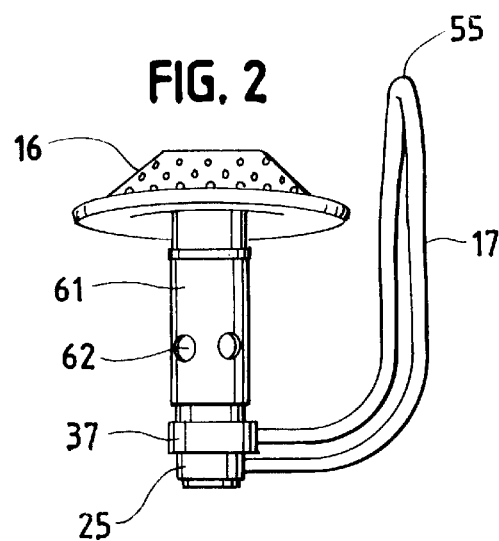
FIG. 2 is a side view of a portion of the burner assembly.

The generator tube 17 includes an inlet end 54, an intermediate portion 55 which forms a loop, and an outlet end 56. The inlet end 54 is connected to the fuel outlet opening 31 of the outer housing 25. The intermediate portion 56 is positioned adjacent the burner head 16 (FIGS. 1 and 2). The outlet end 56 extends through the opening 38 in the outer housing and is connected to the fuel inlet opening 45 of the inner housing.

The generator tube is advantageously attached to the inner and outer housings by brazing. Brazing rings 58 and 59 are sized to fit snugly over the ends of the generator tube. The outlet end 56 of the generator tube is brazed to the inner housing after the inner housing is inserted into the outer housing. The opening 38 in the outer housing should therefore be large enough to allow the generator tube and the brazing ring to pass. In one specific embodiment, the brazing rings were formed from rod stock having a diameter of 0.015 inch. The diameter of the opening 38 was more than 0.030 inch greater than the diameter of the outside diameter of the generator tube. The larger opening 38 also ensures that the outside surface of the outlet end 56 of the generator tube will be spaced from and thereby insulated from the surface of the opening.

The radial extension of the flanges or lands 43 and 44 from the side surface 41 of the inner housing should also be greater than the rod diameter or thickness of the brazing ring 59 to avoid having the brazing ring contact the outer housing during brazing. Contact between the brazing ring and the outer housing would provide a brazed connection between the inner and outer housings. The flanges should therefore extend more than 0.015 inch from the side surface of the inner housing.

A venturi tube 61 (FIG. 2) is screwed onto the eternally threaded upper end of the outer housing. The burner head 16 is connected to the venturi tube. Air openings 62 in the venturi tube allow primary combustion air to be aspirated into the burner tube by high velocity fuel which flows through the orifice of the gas tip 50.

Fuel flows through the burner base 22 and into the generator tube 17. As the fuel passes through the intermediate portion 55 of the generator tube which is near burner head 16, the flame on the burner head heats and vaporizes the fuel. The hot vaporized fuel flows into the inner housing 40 and heats the inner housing. Since the inner housing is thermally insulated from the outer housing, the temperature of the inner housing is high enough to prevent or substantially reduce condensation of the less volatile components of the fuel.

Thermal insulation is provided by the radial flanges or lands 43 and 44 on the inner housing and by the conical bottom wall 35 of the outer housing 25. The outside diameter of each of the flanges is optimally about 0.004 to 0.008 inch less than the inside diameter of the outer housing. The slight clearance between the flanges and the outer housing permits the inner housing to be slightly misaligned, i.e., out of axial alignment, within the outer housing. Each flange therefore touches the inside surface of the outer housing at only one point The remainder of the side surface of the inner housing is separated from the outer housing by an insulating air gap.

A clearance between the flanges 43 and 44 and the outer housing of less than about 0.004 inch would allow more thermal transfer. A clearance greater than about 0.008 inch would allow too much misalignment of the inner housing which would cause the gas tip 50 to be off center in the venturi tube 61. An off center gas tip will not draw primary combustion air properly.

The conical bottom wall 35 also reduces contact, and thereby heat transfer, between the bottom wall and the inner housing 40. At most, contact between the bottom wall and the inner housing will occur on a circular line. However, the inner housing will almost always be slightly misaligned with respect to the axis of the bore of outer housing. Actual contact between the inner housing and the bottom wall will thereby be substantially limited to a single point.

The included angle of the conical wall should be about 150° to 170°. An included angle of 170° gives a 5° angle between conical bottom and the flat bottom wall of the inner housing 40. Much less than 10° allows more thermal transfer. An included angle of 150° gives a 15° angle between the conical bottom wall and the inner housing. A greater angle would move the generator inlet and outlet portions 54 and 56 farther apart.

It is not necessary that the bottom surface be a true cone. Practically any recessed or concave shape will reduce contact. The term "concave" as used herein is therefore meant to include conical as well as curved shapes which reduce surface area contact between the bottom of the inner housing and the bottom wall of the bore of the outer housing. Also, an upwardly extending projection, cone, convex surface, or the like on the bottom wall could also reduce heat transfer. Practically any non-planar surface on the bottom wall will serve to reduce heat transfer to some extent.

Because condensation of fuel components within the inner housing is eliminated or substantially reduced, the porous metal or sintered bronze filter which is commonly used in burner assemblies can be omitted. Instead of a sintered metal filter with small pores, the mesh screen 48 with relatively large pores can be used for trapping particles before they can clog the orifice 51 of the gas tip 50. The pores of the mesh are smaller than the orifice and reduce the possibility that the orifice will be clogged by impurities in the fuel or by carbon deposits.

The size of the mesh is determined by the diameter of the gas tip orifice. The screen opening size must be smaller than the orifice diameter. One stove uses a 0.012 inch diameter orifice, and the screen is a 100×100 mesh with 0.0045 inch diameter wire. The screen openings are 0.0065 inch square. The maximum dimension across the square is 0.009 inch. Particles having a dimension of 0.009 inch which pass the screen would also pass through a 0.012 inch diameter orifice.

Eliminating the sintered metal filter also allows the screen 48 and orifice 51 to be self-cleaning. Liquid fuel is a powerful solvent, and before or after using the appliance, liquid fuel can be allowed to flow through the generator tube into the inner housing. The liquid fuel will dissolve soluble gums and other deposits on the screen and in the orifice, thereby increasing the useful life of the appliance.

The screen and/or the orifice may eventually become plugged with carbon deposits or other deposits which may require cleaning and/or replacement of the screen or gas tip. However, the invention greatly increases the operating life of the appliance before plugging occurs or before heat output is significantly reduced.

In the specific embodiment illustrated the generator tubing has an outside diameter of ⅛ inch. Other sizes could be used but that size has sufficient internal area to provide satisfactory flow even if carbon builds up. That size also will bend to the small radii required.

While in the foregoing specification a detailed description of specific embodiments of the invention was set forth for the purpose of illustration, it will be understood that many of the details herein given can be varied considerably by those skilled in the art without departing from the spirit and scope of the invention.

I claim:

1. A burner assembly for a burner appliance comprising:
an outer housing having an internal bore,
an inner housing positioned within the bore of the outer housing and having a fuel inlet opening and an outlet end,
means for reducing heat transfer from the outer housing to the inner housing,
a burner communicating with the outlet end of the inner housing, and
a generator tube having inlet and outlet end portions and an intermediate portion, the intermediate portion being positioned adjacent the burner and the outlet end portion being connected to the fuel inlet opening of the inner housing.

2. The burner assembly of claim 1 in which the inner housing includes a generally cylindrical side surface and said means for reducing heat transfer comprises at least one flange extending radially outwardly from the side surface.

3. The burner assembly of claim 2 in which said means for reducing heat transfer further comprises a generally concave bottom wall in the bore of the outer housing which supports the inner housing.

4. The burner assembly of claim 3 in which said concave bottom wall is generally conical.

5. The burner assembly of claim 4 in which the conical bottom wall has an included angle of about 150° to about 170°.

6. The burner assembly of claim 1 in which the inner housing includes a generally cylindrical side surface and said means for reducing heat transfer comprises a pair of axially spaced flanges extending radially outwardly from the side surface.

7. The burner assembly of claim 6 in which the outside diameter of the flanges is about 0.004 to about 0.008 inch less than the diameter of the bore of the outer housing.

8. The burner assembly of claim 7 in which said concave bottom wall is generally conical.

9. The burner assembly of claim 8 in which the conical bottom wall has an included angle of about 150° to about 170°.

10. The burner assembly of claim 6 in which said means for reducing heat transfer further comprises a generally concave bottom wall in the bore of the outer housing which supports the inner housing.

11. The burner assembly of claim 1 including a gas tip removably attached to the outlet end of the inner housing, the gas tip having a fuel orifice, and a screen within the inner housing between the fuel inlet opening and the gas tip.

12. The burner assembly of claim 1 in which the outer housing is provided with an opening which is aligned with the fuel inlet opening of the inner housing and the outlet end portion of the generator tube extends through the opening in the outer housing to the fuel inlet opening of the inner housing.

13. The burner assembly of claim 12 in which the opening in the outer housing is sized so that the outlet end portion of the generator tube does not contact the outer housing.

14. The burner assembly of claim 12 in which the opening in the outer housing is larger than the fuel inlet opening of the inner housing and the outlet end portion of the generator tube is brazed to the fuel inlet opening of the inner housing.

15. The burner assembly of claim 14 in which the outlet end portion of the generator tube is brazed to the fuel inlet opening of the inner housing with an annular brazing ring having inside and outside diameters, the outside diameter of the outlet end portion of the generator tube being less than the inside diameter of the brazing ring and the diameter of the opening in the outer housing being greater than the outside diameter of the brazing ring.

16. The burner assembly of claim 15 in which the inner housing includes a generally cylindrical side surface and said means for reducing heat transfer comprises at least one flange extending radially outwardly from the side surface by a distance which is greater than the difference between the inside and outside diameters of the brazing ring.

17. The burner assembly of claim 16 in which the inner housing includes a generally cylindrical side surface and said means for reducing heat transfer comprises a pair of axially spaced flanges extending radially outwardly from the side surface.

18. The burner assembly of claim 1 in which said means for reducing heat transfer comprises a non-planar bottom wall in the bore of the outer housing which supports the inner housing.

19. A burner assembly for a burning appliance comprising:
an outer housing having a generally cylindrical internal bore provided by a generally cylindrical internal wall, the bore having a first open end and a second closed end provided by a bottom wall, the outer housing having a generator tube opening extending into the bore,
a generally cylindrical inner housing positioned within the bore of the outer housing, the inner housing having a bottom wall, a generally cylindrical side wall, and a flange extending radially outwardly from the side wall, the flange having an outer diameter less than the diameter of the bore of the outer housing, the inner housing having an open end, an internal bore, and a inlet opening which is aligned with the generator tube opening in the outer housing,
a gas tip removably attached to the open end of the inner housing, the gas tip having a fuel orifice,
a burner communicating with the fuel orifice of the gas tip, and
a generator tube having inlet and outlet end portions and an intermediate portion, the intermediate portion being positioned adjacent the burner and the outlet end portion extending through the generator tube opening in the outer housing and being connected to the inlet opening in the inner housing.

20. The burner assembly of claim 19 in which the inner housing includes a second flange extending radially outwardly from the side wall, the flanges being axially spaced and spacing the side wall of the inner housing from the internal wall of the outer housing.

21. The burner assembly of claim 20 in which the outside diameter of the flanges is about 0.004 to about 0.008 inch less than the diameter of the bore of the outer housing.

22. The burner assembly of claim 20 in which the bottom wall of the outer housing has a generally concave surface which supports the inner housing.

23. The burner assembly of claim 22 in which the generally concave surface of the bottom wall is generally conical.

24. The burner assembly of claim 23 in which the conical bottom wall has an included angle of about 150° to about 170°.

25. The burner assembly of claim 20 including a screen in the bore of the inner housing.

26. The burner assembly of claim 19 in which the bottom wall of the outer housing has a generally concave surface which supports the inner housing.

27. The burner assembly of claim 26 in which the generally concave surface of the bottom wall is generally conical.

28. The burner assembly of claim 19 including a screen in the bore of the inner housing.

29. The burner assembly of claim 19 in which the bottom wall of the outer housing has a non-planar surface which supports the inner housing.

* * * * *